United States Patent [19]

Sugiura et al.

[11] 4,393,375

[45] Jul. 12, 1983

[54] CONTROL SYSTEM FOR COPYING APPARATUS

[75] Inventors: Masamichi Sugiura, Toyokawa; Kenji Shibazaki, Aichi, both of Japan

[73] Assignee: Minolta Camera Co., Ltd., Osaka, Japan

[21] Appl. No.: 204,592

[22] Filed: Nov. 6, 1980

[30] Foreign Application Priority Data

Nov. 15, 1979 [JP] Japan ................................ 54-148633

[51] Int. Cl.[3] .......................... G06F 9/06; G03B 27/34

[52] U.S. Cl. .................................... 340/700; 340/713; 355/14 R; 364/518

[58] Field of Search ............... 340/700, 706, 713, 718; 355/14 R, 14 C, 14 CU, 14 E; 364/518, 900

[56] References Cited

U.S. PATENT DOCUMENTS 4,158,886 6/1979 Gray, Jr. et al. .................. 364/518

4,196,476 4/1980 Steiner .............................. 355/14 R

OTHER PUBLICATIONS

IBM Technical Disclosure Bulletin; Miller; Program Control of Job Control Information Entry for Copier; 3/1976; vol. 18, No. 10, pp. 3162 and 3163.

*Primary Examiner*—Alvin H. Waring

*Attorney, Agent, or Firm*—Jackson, Jones & Price

[57] ABSTRACT

An improved operator controlled system for a copying machine to minimize user error and to provide a compact control console. An information display member is capable of sequentially displaying an identification of discrete operating features, such as number of copies, etc. A memory is capable of storing a predetermined set of first command signals for each discrete operating feature. A common set of control members permits the user to selectively generate second input command signals relative to any specific operating feature. These same control members are capable of inputing signals for a number of different operating features. The copying machine is capable of discriminating between the input command signals and the particular operating feature. The resulting operation of the copying machine would be in accordance with the predetermined standard set of machine functions or any combination thereof of operator inputed command functions. The specific discrete operating features are automatically displayed after a predetermined set time to minimize any error resulting from operator forgetfulness.

16 Claims, 22 Drawing Figures

CONTROL SYSTEM FOR COPYING APPARATUS

BACKGROUND OF THE INVENTION

1. Field of the Invention

The present invention relates to a control system for copying machines and the like, and more particularly to a control system which includes unique control keys and display devices for use in a copying machine to enable the user to set the number of copies, magnification, the size of copy paper to be used and the density of copy images to determine the operation mode of the copying machine.

2. Description of the Prior Art

With electrophotographic copying machines and the like, the user usually operates selective keys on a control panel to set the number of copies, magnification, the size of copy paper to be used, etc., before starting a copying operation and to thereby operate the machine in the desired mode.

Copying machines available in recent years have a microcomputer incorporated therein and are therefore adapted for a wide variety of functions and operational modes which are selectable by means usually arranged in one location, that is, by keys on an operation panel. While such copying machines are designed for efficient operation, the increase in the number of keys generally requires a complex layout and frequent manipulation of keys in a complicated order, consequently creating the disadvantage that the user is likely to forget to depress some key or make an error in manipulation. U.S. Pat. No. 4,158,886 is cited as an example of a modern copying apparatus control console.

The prior art is still seeking to provide a simplified, error free, operator control console.

SUMMARY OF THE INVENTION

The main object of this invention is to provide a control system for use in copying machines and the like which includes, in a concentrated and yet simplified arrangement, control keys for setting the operational mode of the machine and display devices for indicating the operational settings that are less susceptible to errors or failures in manipulation in spite of the concentrated arrangement.

Another object of the invention is to provide a control system having one display member for successively identifying individual instructions for setting a plurality of operational modes. The control system further being capable of executing each of the instructions in accordance with input command signals using common input control members.

Another object of the invention is to provide a control system which is adapted to execute, with the use of common input control members, the instruction given for each operational mode having different contents individually and successively shown at one display portion. The control console further capable of discriminating the contents of the input control members and using memory means for storing the mode represented by an input command signal.

Stated more specifically, the present invention provides an operator control system comprising a display window, a display device for showing on the window a plurality of operational modes or features of the copying machines, means for changing the indication on the display device, discriminating means associated with the display device and the changing means for discriminating the contents of the indicated operational mode on the window, a common operator input means, and memory means for storing different contents individually in accordance with the indications by associating the content of the indication identified by the discriminating means with an input signal from the common input means.

Additionally, the control system can be preset to a particular mode of operation and varied by the operator to comply with his subjective desires. The specific operating features can be sequentially identified on the display window and can be automatically changed after a predetermined time period.

The objects and features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

BRIEF DESCRIPTION OF THE DRAWINGS

FIG. 2(*b*) is a schematic of the peripheral surface of the drum to show the operational features on the rectangular faces of the drum for illustrative purposes;

DESCRIPTION OF THE PREFERRED EMBODIMENTS

The following description is provided to enable any person skilled in the electrophotographic copying arts to make and use the invention and sets forth the best modes contemplated by the inventors for carrying out their invention. Various modifications, however, will remain readily apparent to those skilled in the art, since the generic principles of the present invention have been defined herein specifically to provide an improved control system for a copying apparatus that can be used in an efficient manner.

The present invention is specifically designed to provide an improved simplified control console for reproduction machines that are frequently operated by clerical help. The control system recognizes the complexity of traditional control panels and seeks to minimize the opportunity for errors to be made in operating the copying machine. In this regard, the copying machine can be subjectively standardized to a specified set of machine functions as desired by the user. An operator will be given the opportunity to change the individual operating features of the standardized set by inputing overriding input command signals into the machine. An information display panel or member will sequentially display an identification of discrete operating features for viewing by the operator. A set of control members that are positioned relative to the display member will permit the operator to respond to a discrete operating feature, e.g., number of copies, density of image, etc., and input a specific command to produce the desired result. Since the control console will sequentially display each of the discrete operating features, the chance of error in forgetting any specific desired operating feature will be minimized. Additionally, since the same control members are capable of providing a common operator input for each of the plurality of discrete operating features that are displayed, the overall operation of the control console will be simplified. The subsequent printing operation of the copying machine can either be in accordance with the predetermined operating values that have been established as a standard or can be the result of any operator generated input command signals that can alter one or more of the predetermined set of standard command signals to produce the desired result.

Figure 10:
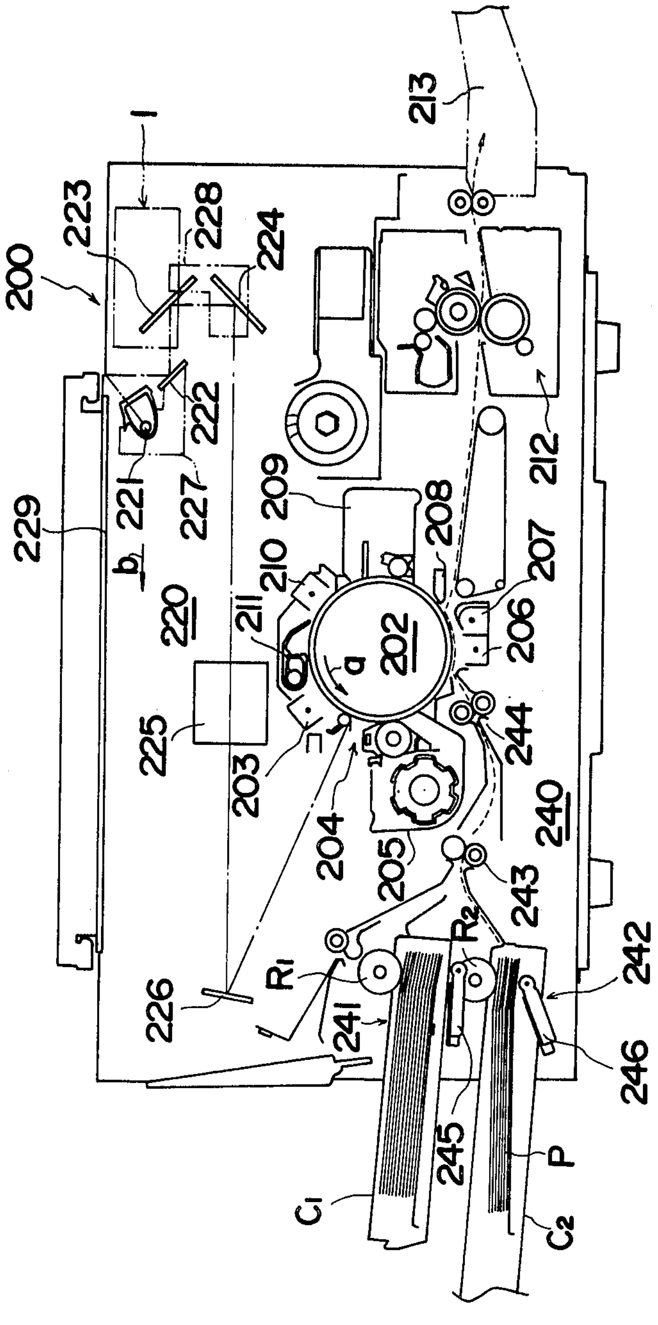
FIG. 10 is a schematic cross sectional view of a copying machine responsive to the console control panel.

An example of one form of electrophotographic copying machine is disclosed in a schematic cross sectional view set forth in FIG. 10. The construction and operation of this copying machine will be described to facilitate a full understanding of the environment of the present invention.

The electrophotographic copying machine 200 contains a photographic drum 202 that is rotatable in the direction of the arrow a. The drum 202 is positioned approximately in the center of the main body of the machine 200. Arranged peripherally around the drum 202 are a sensitizing charger 203, an exposure slit member 204, a developer unit 205, a transfer charger 206, an erasing A.C. charger 207, a separating pawl 208, a cleaning unit 209, a pre-charger 210 and an eraser lamp 211. while the photographic drum 202 rotates, these individual components can co-act in a sequential manner with the photoconductive surface of the drum 202 to transfer a toner image of an original document onto a copy paper that has been fed to the drum 202 in a specific timed relationship to the rotation of the drum.

More specifically, the photoconductive surface is precharged by the charger 210 after a preliminary cleaning step, then illuminated with the eraser lamp 211 for the removal of the charges and thereafter charged again by the sensitizing charger 203. An original document (not shown) is scanned by a scanning system, to be described later, to continuously project the image of the original on the charged surface of the drum through the exposure slit member 204 to form a latent electrostatic image, which is subsequentially developed by the developing unit 205 with a toner. The toner image on the drum 202 is transferred onto copy paper which is delivered to the drum 202 in a timed sequence determined by the control system to be described later. The copy paper, bearing the toner image, is separated from the drum surface by the erasing A-C charger 207 and the separating pawl 208 and is fed to a fixing unit 212, wherein the image is thermally fixed to the paper. The printed copy is discharged from the main copier body onto a discharge tray 213. The toner remaining on the surface of the drum 202 after the image transfer is then scraped off the surface of the cleaning unit 209. This is followed by the precharging step previously mentioned.

The light scanning system 220 includes an exposure lamp 221, a first reflector 222, a second reflector 223, a third reflector 224, a lens unit 225, and a fourth reflector 226. The exposure lamp 221 and the first reflector 222 are movable together and supported by a scanning unit 227. The second and third reflectors 223, 224 are movable together as held by a support unit 228. The fourth reflector 226 is held in a fixed position. The scanning unit 227 and the reflector support unit 228 are associated with drive means and guide means (not shown) so that during the scanning of the original document on a glass plate 229, the units 227 and 228 are movable in the direction of an arrow b parallel with the glass plate 229 at speeds of V/M and V/2 M, respectively. V is the speed of rotation of the drum 202 (speed of transport of the copy paper), and M is the magnification of the copy.

The system 240 for feeding and transporting the copy paper P includes cassette loading portions 241, 242 positioned on the main body in two superimposed stages, feed rollers $R_1$, $R_2$ disposed in fixed positions above the loading portions 241, 242, respectively, intermediate rollers 243 and timing rollers 244. The upper and lower loading portions 241, 242 are loaded with cassetts $C_1$, $C_2$ containing stacks of copy paper P, which are pressed against the feed rollers $R_1$, $R_2$ by pushing members 245, 246. One of the feed rollers $R_1$, $R_2$ is selectively rotated to feed the copy paper P into the main body.

A control console or panel 1 of the present invention, shown schematical in broken lines at a right upper portion of FIG. 10, is provided on the casing (not shown) of the main body of the copying machine 200.

Figure 1:
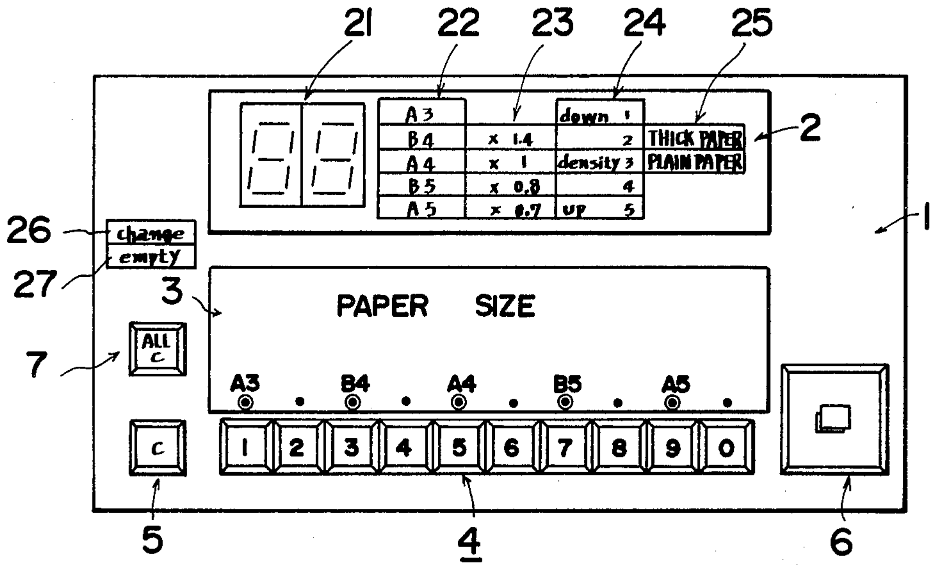
FIG. 1 discloses an exemplary layout of display portions and control keys on the console control panel of a copying machine.

FIG. 1 is a diagram showing one example of the control panel 1 of the control system according to the invention. A display portion 2 for mode settings (hereinafter referred to as a "first display portion") has, for example, a copy number indicator 21, a paper size indicator 22, a magnification indicator 23, a density indicator 24 and a paper indicator 25, for showing the variable operating features or conditions set by a user or operator in the procedures to be described later. A display member or window (hereinafter referred to as a "second display portion") 3 successively shows an identification or title of the copying conditions to be indicated by the first display portion 2 for setting a plurality of operating modes. Indicated at 4 is a set of common control members in a ten-key arrangement for setting the number of copies and also for setting various copying conditions. 5 is a CLEAR key for correcting input, while 6 is a print switch key for starting a copying operation. 7 is an ALL CLEAR key for returning the settings to a predetermined standard mode with appropriate command signals from a memory. The term "standard mode" refers to an operating mode selected by a combination of settings which are most likely to be used for the usual copying operation, or by the combination of such settings that even when an operation start instruction is given by faulty manipulation, the resulting loss is small. The standard mode can dffer from user to user, or in accordance with a predetermined performance of the copying machine. For example, it is herein assumed that the standard mode is given by the following settings of: number of copies=1, paper size=A4, magnification-life size (X1), density-standard (index 3 in FIG. 1), and paper=plain.

Figure 2A:
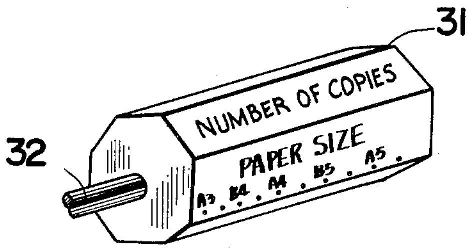
FIG. 2(*a*) discloses a perspective view of a rotatable drum capable of successively showing a plurality of operational modes or features of the copying machine on a display window.
Figure 2B:
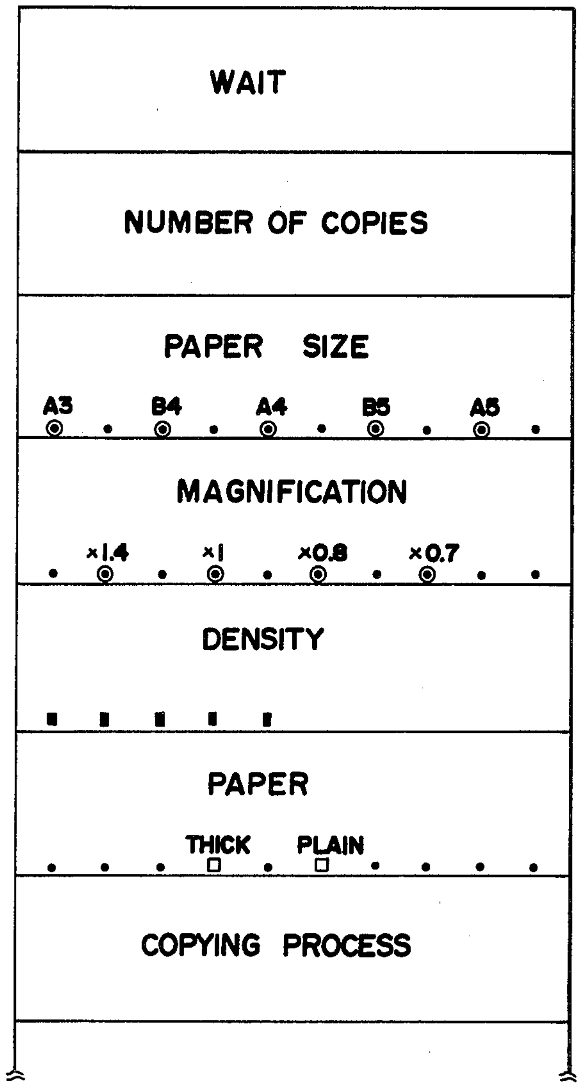
Figure 3:
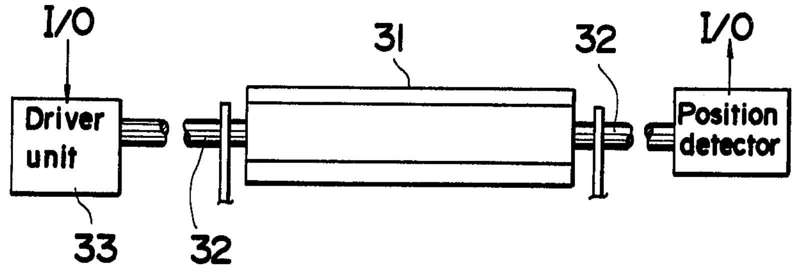
FIG. 3 is a schematic of a drive unit and a position detector for the display drum.

FIGS. 2 (*a*) and (*b*) and FIG. 3 show a specific example of means for successively identifying the titles of condition settings on the window of the second display portion 3. As seen in FIG. 2 (*a*), a display drum 31 in the form of a prism of polygonal cross section is rotatably supported on a shaft 32. The drum 31 bears a series of titles on its rectangular faces as shown in the development of FIG. 2 (*b*). A drive unit 33 shown in FIG. 3 rotates the drum 31 to bring the rectangular faces, one after another, into opposed relation with the window of the second display portion 3. The titles can be illuminated with a lamp or the like (not shown) within the drum 31.

As will be described later, the drive unit 33 rotates the display drum 31 in response to an operation instructing signal from a microcomputer 70. A position detector 34 detects the angle of rotation of the drum 31, and this detected value is fed to the microcomputer 70, which judges which face of the drum is displayed. The drive unit 33 is similar to a counter drive means and comprises, for example, a solenoid operable in response to a suitable pulse signal from the microcomputer 70, and stepwise advancing means for rotating the shaft 32 by the operation of the solenoid. The position detector 34 comprises, for example, an encoder for detecting the angle of rotation of the shaft 32 and converting the detected value to a digital signal. Suitable alternative devices, which will be apparent to one skilled in the art, may be selected for use as components 33 and 34.

Figure 4:
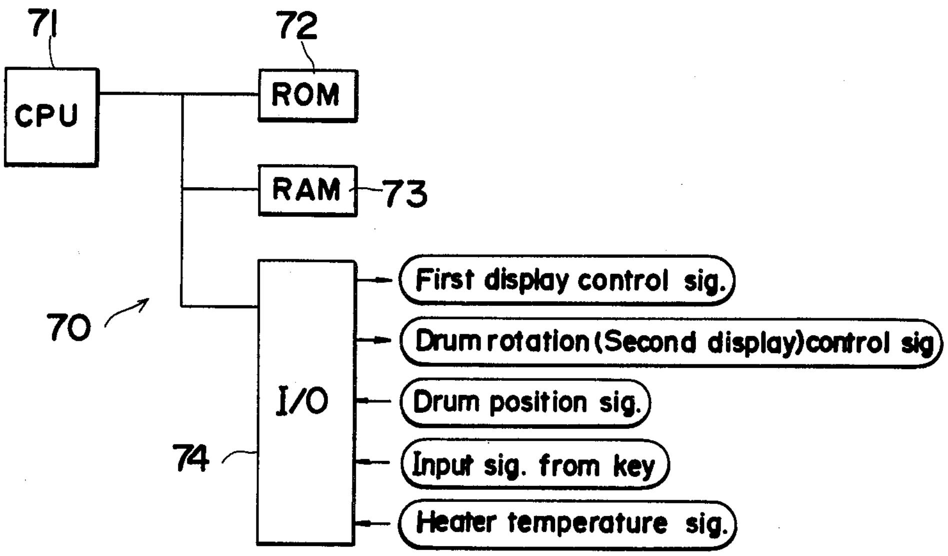
FIG. 4 is a simplified block diagram of a microcomputer as an example of a control circuit for controlling the rotation of the drum and the indications thereon.
Figure 5A:
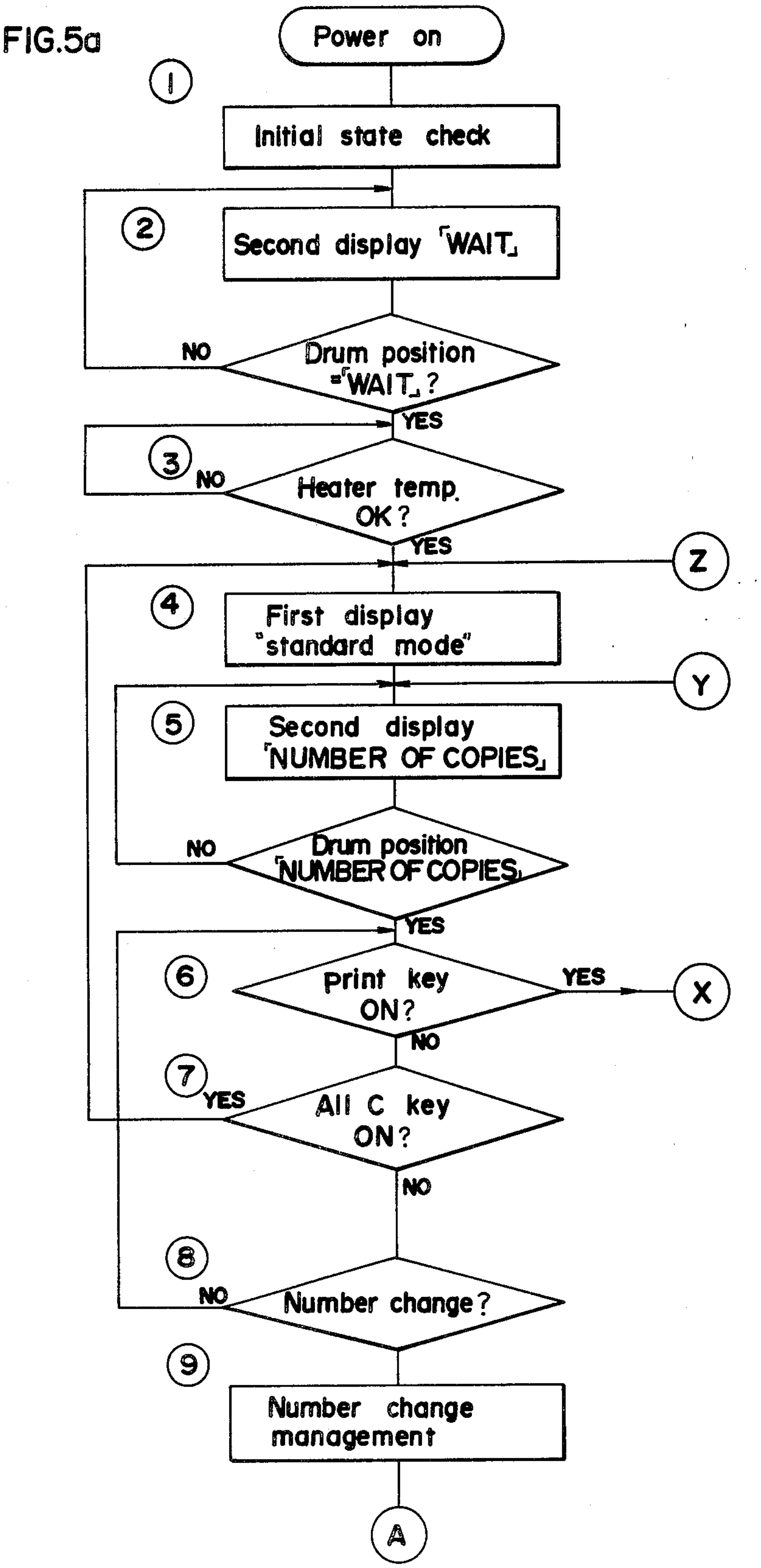
FIGS. 5(*a*) to (*f*) are flow charts showing exemplary modes of control carried out by the microcomputer.
Figure 5B:
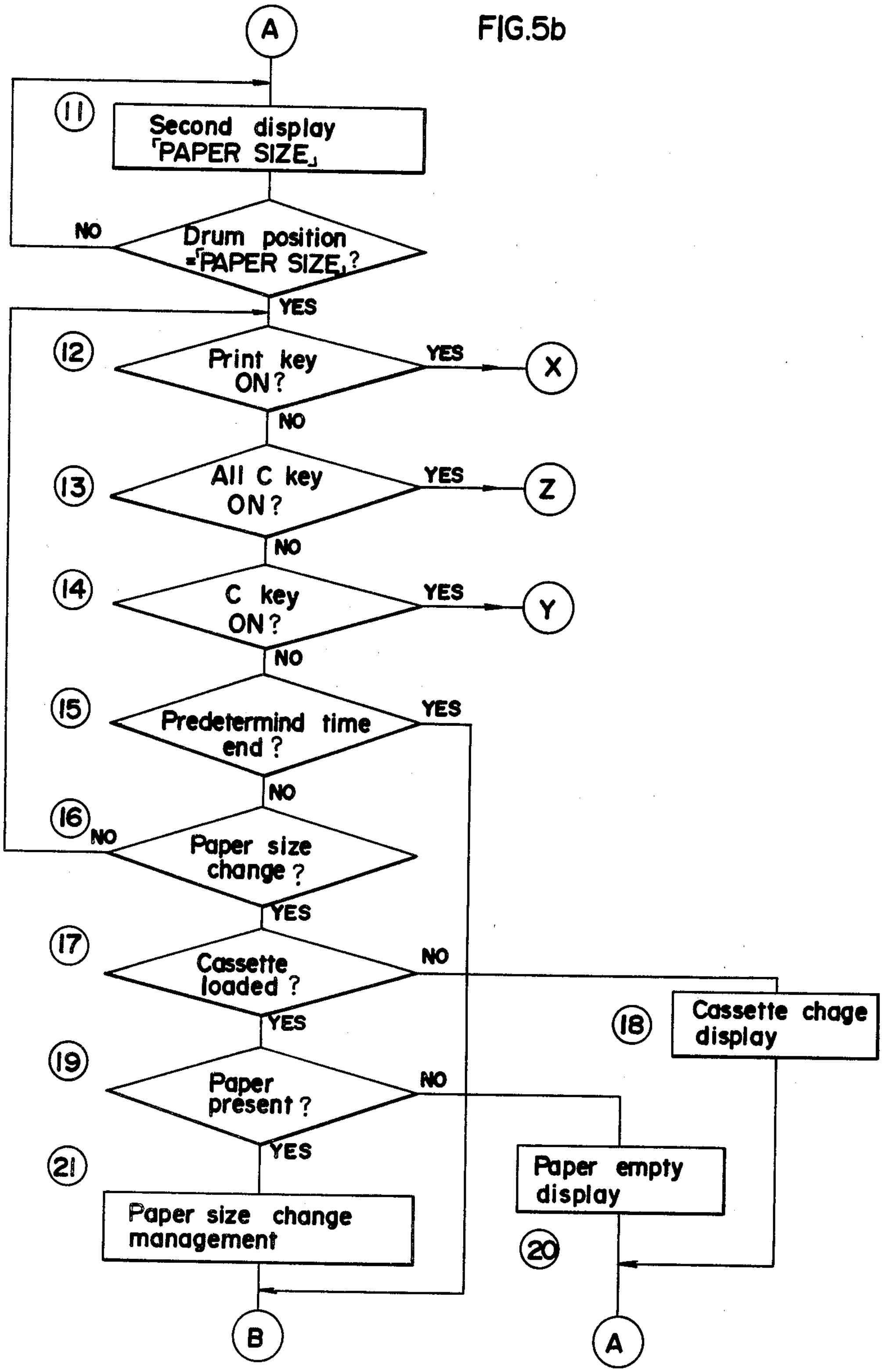
Figure 5C:
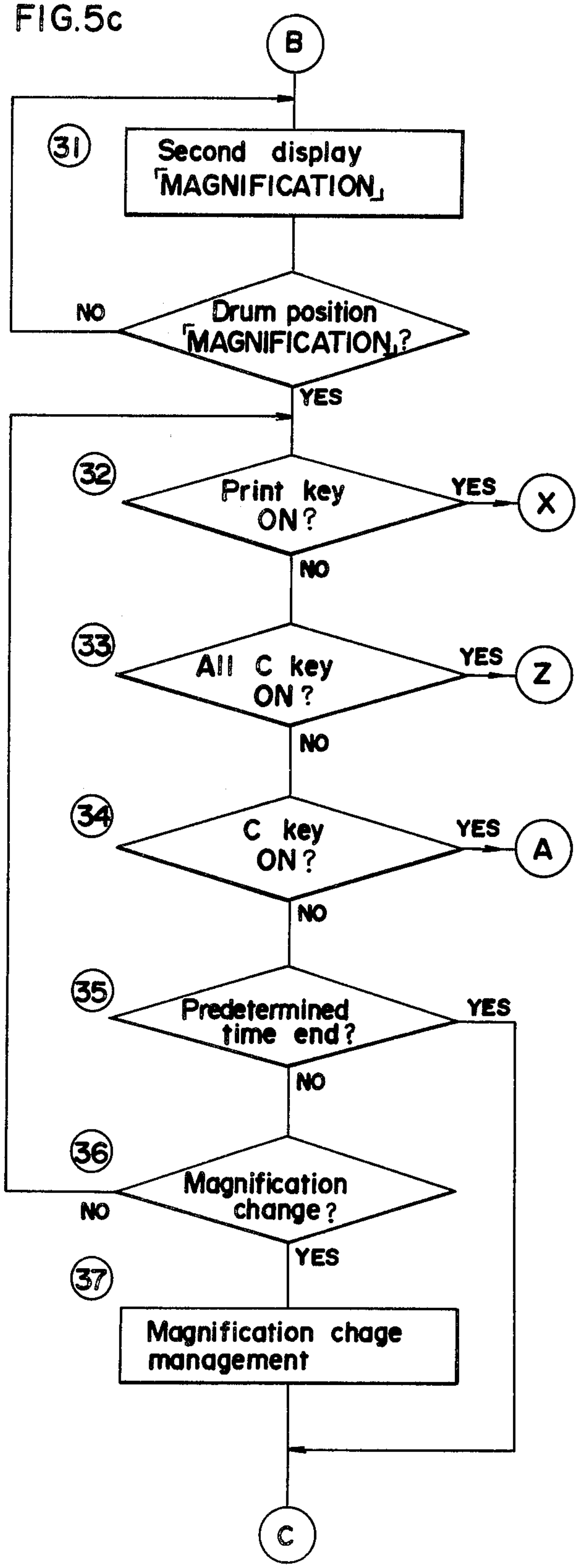
Figure 5D:
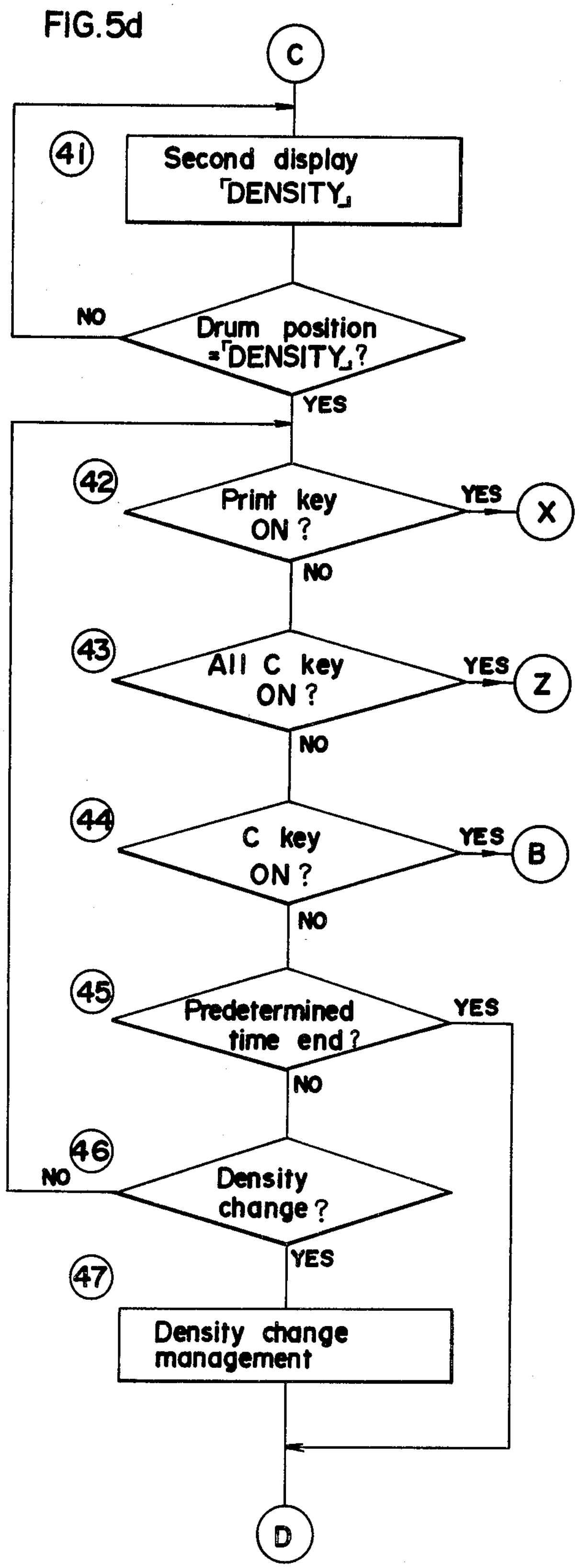
Figure 5E:
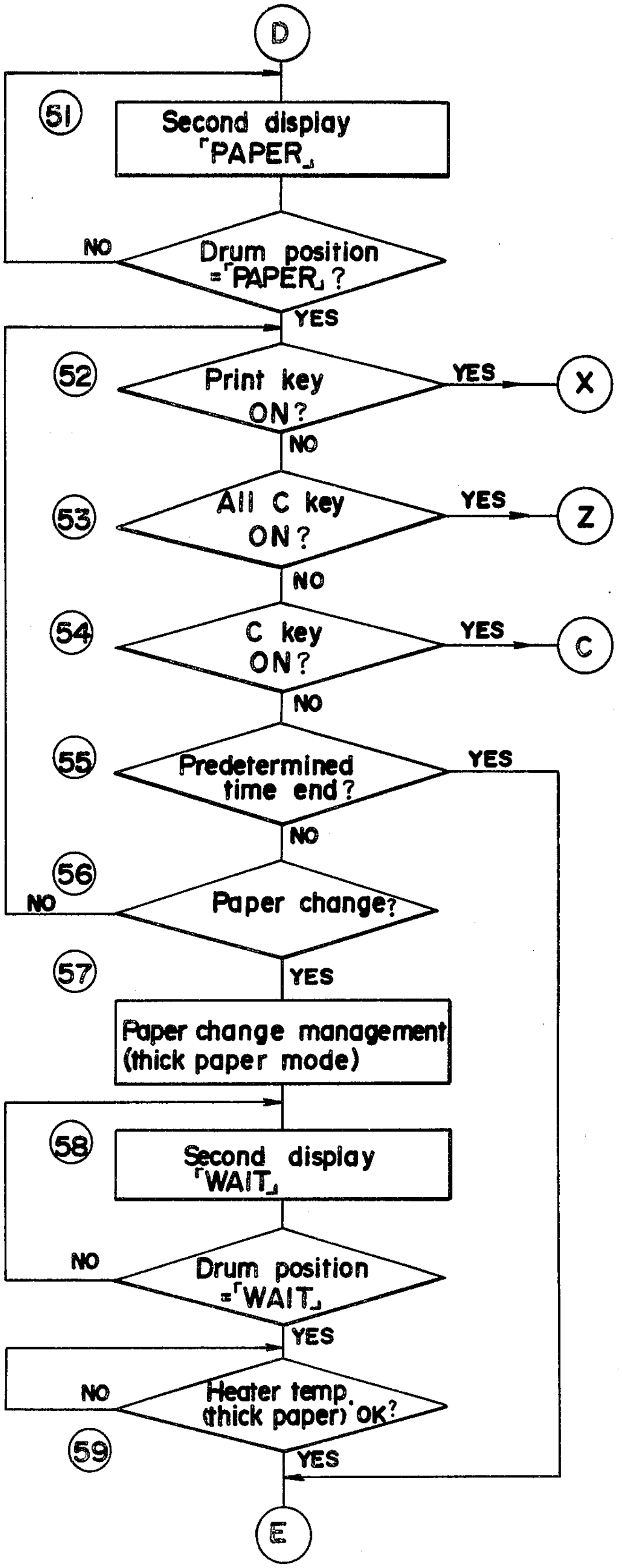
Figure 5F:
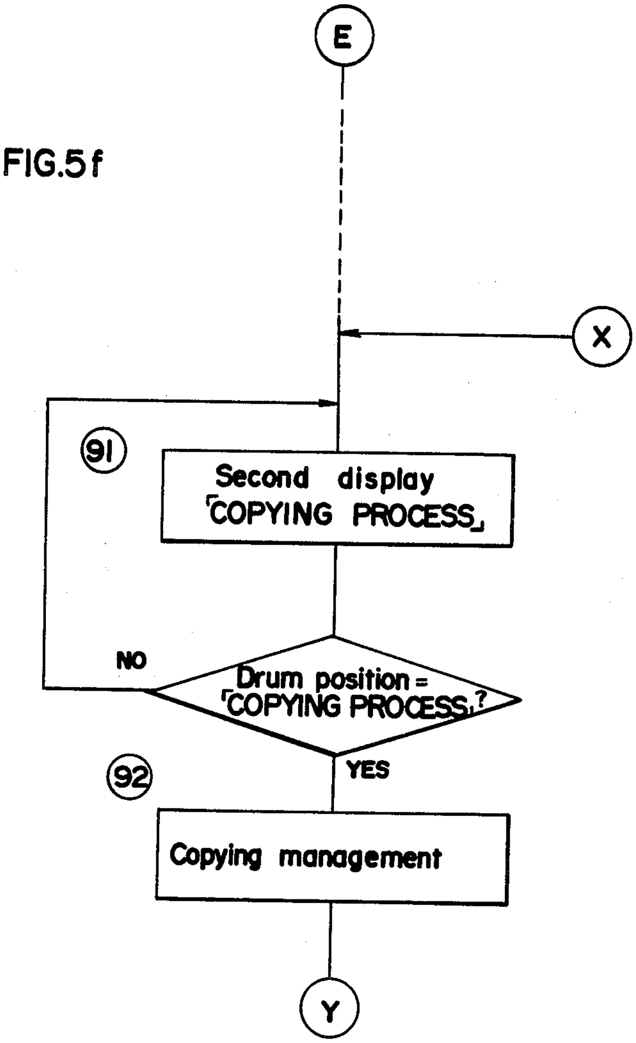

FIG. 4 schematically shows the construction of the microcomputer 70 for giving control signals to the first display portion 2, drive unit 33, etc., in response to the signals from the control panel 1, position detector 34, etc., and for setting an operation mode based on the indication on the second display portion 3 and signal input from the ten-key arrangement 4. The operation of the copy machine and the microcomputer 70 will be described below with reference to the flow charts of FIGS. 5 (*a*) to (*f*).

Power, when supplied to the copying machine 200, is also fed to the control circuit including the microcomputer 70, whereby the copying machine 200 is checked for the initial state in flow chart step (1). More specifically, the original scanning system 220 is checked for proper position, the path of transport of copy paper P for the absence of paper P, and the cassettes $C_1$, $C_2$ for the presence of paper P.

In step (2), a rotation instructing signal is fed to the drive unit 33 for the display drum 31 from an input-output interface (I/O) 74, and "WAIT" is shown on the second display portion 3.

In step (3), a heater (not shown) of the fixing unit 212 is checked for the rise of its temperature to a predetermined specified level based on the signals from a sensor (not shown) for detecting the temperature. The copy system remains in a standby state while preventing the start of copying operation until the temperature rises to the specified level.

In step (4) following the specified rise of the temperature of the heater to a desired level, the standard mode of operating features stored in a memory 72 of the microcomputer 70, as mentioned above, is indicated on the first display portion 2, and the data of this standard mode are also shifted to RAM 73 of the microcomputer 70.

Subsequently in step (5), the display drum 31 is advanced by one step to show the title "NUMBER OF COPIES" on the second display portion 3.

In step (6), the print switch 6 is checked for whether or not it has been depressed by the operator. If the switch is activated, steps (91) and (92) follow (see FIG. 5 (*f*)) to give an indication of "COPYING PROCESS" by rotating the drum 31 and perform a copying operation under the standard conditions already set. The same procedure follows also upon depression of the print switch 6.

If the print switch 6 is found to be off, step (7) proceeds wherein the ALL CLEAR key 7 is checked for whether or not the key has been depressed. The key 7 forcibly returns the conditions set by the operator to the predetermined standard mode. When the ALL CLEAR key 7 is on, step (4) and the subsequent steps follow. The same procedure follows also upon depression of the key 7. If the ALL CLEAR key 7 is found to be off, step (8) follows which checks whether or not the number of copies has been changed by the user. If there is a change, the number is shown on the copy number indicator 21 in the first display portion 2 in step (9), and the numerical value is also shifted to the RAM 73. The change of the number of copies is made by the user while the indication "NUMBER OF COPIES" of the drum 31 is shown on the second display portion, with the information thereof fed by the position detector 34 to CPU, in the usual manner, i.e., by depressing the ten-key arrangement 4. The numerical value given by the depression appears on the indicator 21.

The setting of the copy number is followed by step (11) in FIG. 5 (*b*), in which the display drum 31 is advanced by one step to show the indication "PAPER SIZE" on the second display portion 3. Steps (11) to (21) are for setting the paper size. With the indication "PAPER SIZE" given, the print switch 6 is checked in step (12). As in step (6) under the indication of "NUMBER OF COPIES", a copying process (steps (91) and (92)) is carried out under the existing set conditions upon depression of the print switch 6. In step (13), the ALL CLEAR key 7 is checked as in step (7). Depression of the key 7 is followed by step (4) of setting the standard mode.

The CLEAR key 5 for correcting the data set in the preceding procedure is checked in step (14). Since the indication of the size is given at the second display portion 3 in step (11), the CLEAR key 5, when depressed in step (14), returns the system to step (5) to change the preceding data setting, that is, to change the number of copies as a copy number setting procedure.

Step (15) checks whether or not a predetermined period of time, e.g., 15 to 30 seconds, has elapsed after the indication of the size is made at the second display portion 3. In other words, this step checks whether or not there is any input during the predetermined period of time following the indication of the size at the second display portion 3. The absence of input for that period is interpreted as meaning that the user intends no change, so that the setting of magnification follows without any size change. Such time check may also be conducted under the indication of "NUMBER OF COPIES".

Step (16) checks user's paper size setting for any change. At this time, the sizes usable (e.g., in the combination shown in FIG. 1) are shown on the second display portion 3. The user depresses a key in the arrangement 4 at the position of the desired size shown for the selection of the size. More specifically, under the condition in which "PAPER SIZE" is shown, the CPU 71 identifies the desired size based on the ten-key input signal and selects the program thereof. In the illustrated embodiment, the paper sizes are in such relation with the ten-key arrangement 4 that A3 size corresponds to key "1", B5 size to key "7", and so forth. With the paper size to be used thus specified, step (17) checks whether or not the cassette of the specified size has been loaded in place. If not loaded, a CHANGE lamp 26 goes on to indicate the necessity to change the cassette. This is followed by the setting of paper size (step (11)). For the discrimination of the sizes of cassettes, each cassette may be given a code which corresponds to the size of paper therein and which can be identified by a specific arrangement of a magnet or surface projection.

When the machine has loaded therein the cassette of the size desired for the change, the cassette is checked for the presence of paper therein in step (19). In the absence of paper, an EMPTY lamp 27 goes on in step (20) for the indication of the absence, and the size setting step (11) follows.

In step (21), the paper size selected is displayed in corresponding relation to the size indicator 22 in the first display portion 2, and the information is fed to the microcomputer 70.

When further settings and indications are made in succession, with the second display portion 3 showing the indications of "MAGNIFICATION", "DENSITY", and "PAPER, THICK or PLAIN", one after another, the items to be selected shown in FIG 2 (*b*) appear on the second display portion 3 in corresponding relation to predetermined keys in the arrangement 4. Thus, the user depresses the keys corresponding to the items indicating the desired operating conditions. The flow charts of FIGS. 5 (*c*) to (*e*) show the steps to be performed under the above indications.

In any case, a signal detecting the position of the display drum 31 is fed to the CPU 71 to identify the specified condition under which the ten-key arrangement, when manipulated, selects the data in conformity with the condition. Thus, the keys in the arrangement 4 can be used as most of the keys needed for setting the conditions. This is useful in reducing the number of keys required and permits a common set of control members to be used.

Some of the indications shown in FIG. 2 (*b*) will be described briefly. Under the indication "MAGNIFICATION", a key "8" in the ten-key arrangement 4 corresponds to copies on a reduced scale of 2:1 in area ratio (X0.7), and a key "2" copies on an enlarged scale of 1:2 in area ratio (X1.4). With respect to "DENSITY", a key "3" corresponds to the standard density, with the density gradually decreasing with the decrease of the key number and increasing with the increase of the key number (up to 5).

In steps (51) to (59) of the flow chart of FIG. 5 (*e*), plain paper is set for the standard mode, and the change of mode indicated means that the user depresses a key (not shown) for the use of thick paper. When the paper is changed by the user in step (56), the change is shown on the paper indicator 25 of the first display portion 2 in step (57), followed by step (58) in which a rotation instructing signal is given to the driven unit 33 for the drum 31, with "WAIT" shown on the second display portion 3 until the heater reaches the proper temperature for the thick paper in step (59). Generally the heater is set at a higher temperature for the thick paper than for the plain paper. Usually in step (91) following the depression of the print key 6 for the plain paper, "COPYING PROCESS" is shown on the second display portion, and a copying operation is conducted in the existing mode in step (92), which is followed by the copy number setting step (5). However, when the thick paper is used, the paper is not fed automatically from a cassette, but is fed manually. Thus, after the heater has reached the temperature specified for the thick paper, the forward end of the paper is inserted into the manual feed mechanism. A generated signal for detecting introduction of the thick paper performs the same function as the closing of the print switch 6. Such manual feed mechanism and copying process initiating means therefor are already known in the art and, therefore, will not be illustrated or described.

The control system, when set in each of the states described, permits a copying operation under the conditions already involved in the set state. When no condition is set for a predetermined period of time, setting of another condition automatically follows. When an instruction is not given for each setting, the predetermined standard data will be used.

Although the foregoing embodiment is adapted to show the indication "WAIT" on the second display portion 3, alternative indicating means may be usable.

While examples of indications are shown in FIG. 2 (*b*) for the second display portion, such indications may be made settable in an order of importance suitably determined for the convenience of the user.

The flow charts illustrating the operation of the microcomputer in the foregoing embodiment are given for illustrative purposes only and are not limitative. There is no particular need to use the microcomputer itself if alternative means are usable for achieving substantially the same results as described above. However, use of the microcomputer is advantageous in simplifying the circuit and setting a wide variety of modes of operation.

Steps (31) to (37), (41) to (47), and (51) to (57) in FIGS. 5 (*c*) to (*e*) will be readily understood from the description of FIGS. 5 (*b*) and (*b*), although not described in due order.

While the drum 31 in the embodiment given above is adapted to automatically advance by one step on completion of setting a command input under each indication or on lapse of a predetermined period of time, a "step key" or the like may be usable which emits signals for advancing the drum 31 stepwise. (Such means corresponds to the ENTER key shown in FIG. 6.)

Further, the display drum in the form of a prism of polygonal cross section for showing the titles of settings can be replaced by a belt marked with like titles and adapted to be wound up or unwound for giving the indications. The display contents in this case are detectable by an encoder similar to the one described.

With reference to FIG. 6 to FIGS. 9 (*a*) and (*b*), another embodiment will be described which involves somewhat different indications and which includes display means, such as a CRT (cathode ray tube) or liquid crystal display device, for electrically showing letters as the means for successively displaying the titles of various condition settings.

Figure 6:
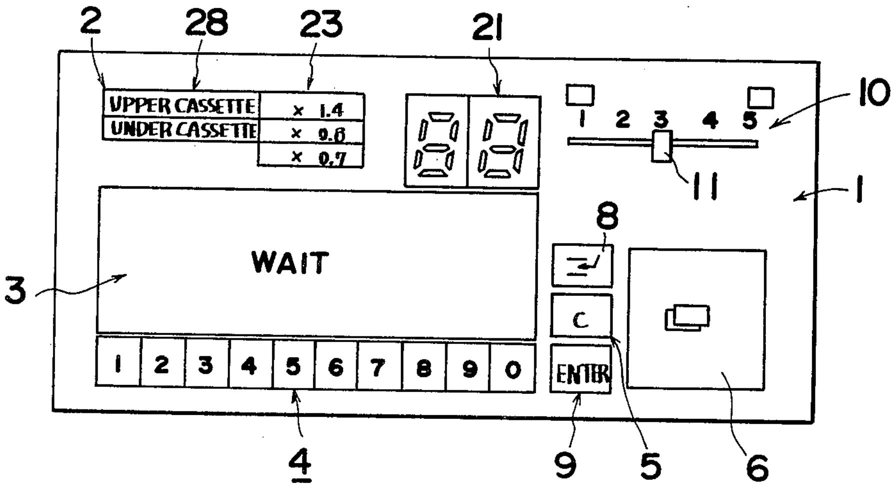
FIG. 6 shows another exemplary layout of a console control panel.

FIG. 6, like FIG. 1, shows an exemplary control panel 1. In FIGS. 1 and 6, like parts are referred to by like reference numerals, and different parts will be described in detail. The panel 1 includes a second display portion 3, a CLEAR key 5, a print switch 6, a copy number indicator 21, a magnification indicator 23, etc., which have the same functions as those of FIG. 1.

Indicated at 8 is an "interruption" key so that when a multiplicity of copies of an original are being made continually, the continual operation is temporarily stopped for copying another original. Designated at 9 is the ENTER key to be depressed when the indication on the display window 3 is to be changed. Control means 10 for adjusting the density of copy images includes an index 11 which, when shifted sidewise, controls, for example, the illumination of the exposure lamp 221 for the adjustment of the image density.

Figures 7A, 7B, 7C, 7D, 7E, 7F:
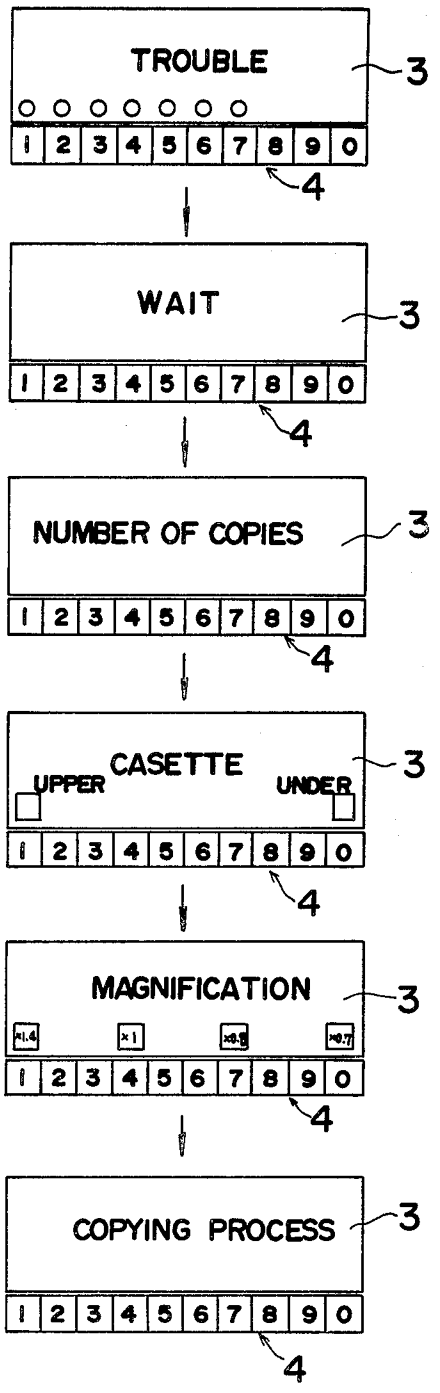
FIGS. 7(*a*) to (*f*) show schematic examples of operational features on the control panel.
Figure 8:
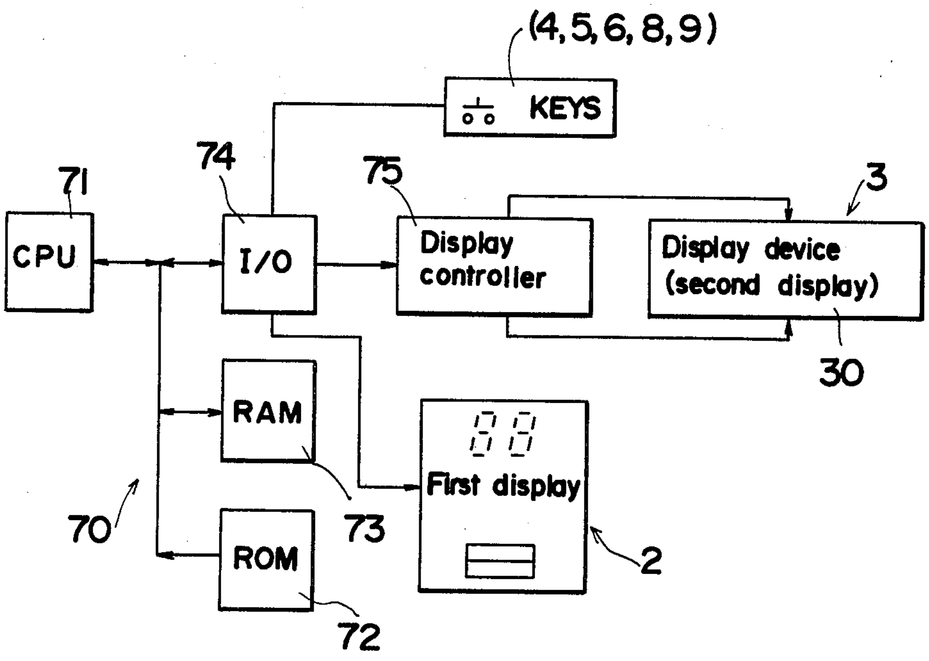
FIG. 8 shows a schematic circuit diagram for associating input keys, etc., with a microcomputer for controlling the indications.

FIG. 7 shows examples of the identification titles of the operating features to be shown on the second display portion 3. FIG. 8 is a block diagram showing an example of a control circuit therefor.

FIG. 7 (*a*) shows an indication of "TROUBLE" which is given when the copying machine is jammed with paper or malfunctions, either on energization or during operation. This indication may further include some indices that can be positioned above keys of predetermined numbers in the ten-key arrangement 4 for indicating the locations of possible jamming or malfunctions. FIG. 7 (*b*) shows an indication of "WAIT" which remains on display until the temperature of the heater reaches a predetermined level. FIG. 7 (*c*) shows the indication of "NUMBER OF COPIES", while FIG. 7 (*d*) shows the indication of "CASSETTE" for the selection of either one of the upper or lower cassettes. The key "1" in the ten-key arrangement 4 is used for selecting the upper cassette, and the key "0" for the lower. FIG. 7 (*e*) shows an indication of "MAGNIFICATION" wherein the key "1" in the arrangement 4 is used for the magnification of X1.4, the key "4" for X1, the key "7" for X0.8, and the key "0" for X0.7. The indication for "COPYING PROCESS" is shown in FIG. 7 (*f*).

The control circuit of FIG. 8, like the one shown in FIG. 4, includes a microcomputer 70. The input signal from an input key 4, 5, 6, 8, 9 or the like on the control panel 1 is fed through an input-output interface (I/O) 74 to CPU 71, in which the signal is identified, whereupon a signal of the information stored in ROM 72 or the like is applied to a display controller 75 to show the corresponding title on the display device 30 of the second display portion 3. The input information is shifted also to RAM 73, in which the standard copying condition is stored. Based on the content of the storage and a program stored in the ROM 72, the system controls the copying operation.

Figure 9A:
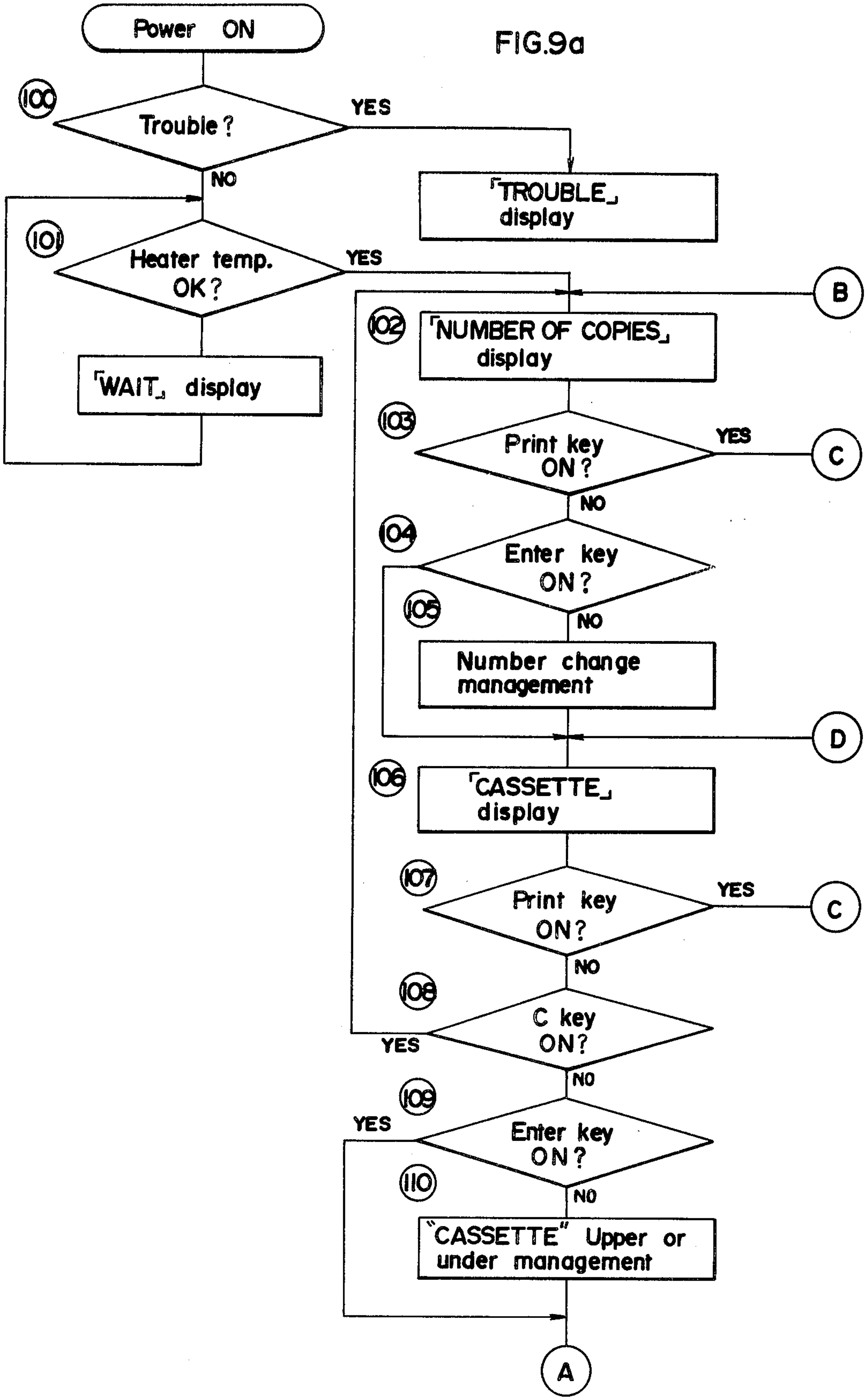
FIGS. 9(*a*) and (*b*) are flow charts showing modes of control afforded by the microcomputer.
Figure 9B:
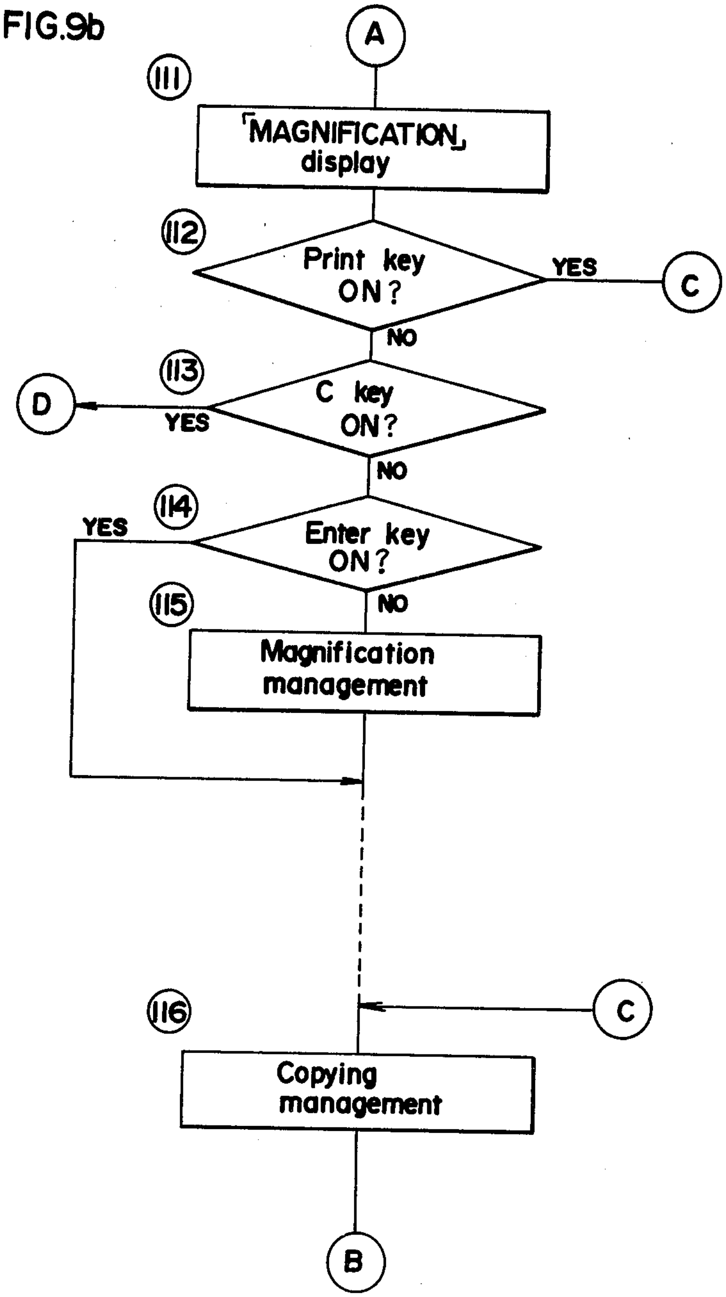

FIGS. 9 (*a*) and (*b*) are flow charts showing modes of control provided by the control circuit.

With reference to FIG. 9 (*a*), the copying machine, when energized, is checked for initial trouble in step (100). When some trouble is detected, "TROUBLE" is shown. The term "trouble" can mean a short or break in the electric circuit, a malfunction of motors when they are driven upon the supply of power, or like failure. Such a failure is identified by a checking signal from the microcomputer 70. When the machine is found free of any trouble, "WAIT" is shown in step (101) until the temperature of the heater of the fixing unit rises to the specified level. The rise of the temperature is followed by step (102), which a control signal for showing "NUMBER OF COPIES" is fed from the microcomputer 70 to the display controller 75. At the same time, the standard mode (e.g., number of copies=1, cassette=the upper, magnification=X1) stored in the ROM 72 is shifted to the RAM 73. The standard settings are shown also on the first display portion 2.

Steps (103) and (104) check the print key 6 and the ENTER key (9), respectively, as to whether or not they have been depressed. Depression of the print key 6 is followed by step (116) to start a copying operation in the standard mode. On depression of the ENTER key 9, step (106) proceeds with the number of copies still set at 1, giving the next indication of "CASSETTE". Thus, the ENTER key 9 functions to advance the indication on the second display portion 3 by one step.

When the desired copy number input is given by the ten-key arrangement 4 without depressing the print key 6 and ENTER key 9, step (105) follows, showing the copy number on the indicator 21 of the first display portion 2 and shifting the numerical data to the RAM 73. On completion of copy number setting, step (106) proceeds to display "CASSETTE".

In steps (107), (108), and (109), the keys concerned are checked, and the same procedures as set forth above then follow. FIG. 9 (*b*) shows steps (111) to (115) for the indication "MAGNIFICATION". These steps are executed substantially in the same manner as the foregoing steps (102) to (110). Step (116) includes all the copying process following the depression of the print key 6.

The display device 30 for the second display portion 3 and the display controller 75 therefor are already well known and will not be illustrated or described. For example, CRT and liquid crystal display devices are useful as the device 30.

The indications on the second display portion of the second embodiment, unlike those given by the drum 31 of FIG. 2 (*a*), are provided by the output from the microcomputer 70, so that there is no need to use an encoder or like device for discriminating the display contents. To use the input signals given by the ten-key arrangement 4 commonly for the different indications from set various conditions, the control afforded by the present system is so programmed that a specific key input gives a predetermined instruction in accordance with a particular indication.

The indication "WAIT" may be given by some other display device in this case.

Although the ten-key arrangement 4 is used in the foregoing embodiments as the common input means for various indications, another suitable key input device is alternatively usable.

Briefly, the control system of this invention comprises a display window for successively giving indications of different operating features and common input means for executing instructions specified by the indications. Accordingly, the display window and control push buttons, keys and the like can be arranged within a reduced space, whereas the system limits the possible manipulation errors or failures.

As can be appreciated, various modifications of the generic concepts of this invention are possible without departing from its spirit and, accordingly, the scope of the present invention should be determined solely from the following claims.

What is claimed is:

1. In a reproduction machine for producing paper copies of original documents having the capacity of providing discrete operating features such as providing one or more copies, varying the magnification of a copy, changing the size of the copy paper and changing the image density, the improvement including a control system comprising:

an information display member;

means for sequentially displaying an identification of discrete operating features of the reproduction machine on the same display member;

memory means for storing a predetermined set of first command signals for each discrete operating feature;

operator controlled input means for selectively generating second input command signals relative to specific operating features;

means for coordinating a particular operating feature that is identified on the display member with a specific second input command signal;

means for storing the specific second input command signals, and means for altering the predetermined set of first command signals by replacing any individual predetermined first command signal with a corresponding operator generated second input command signal to subsequently cause the reproduction machine to be activated in response to the predetermined set of first command signals as altered by the operator generated second input command signals.

2. The invention of claim 1 wherein the operator controlled input means includes a set of manual control members operatively positioned relative to the display member for generating the second input command signals, the individual control members providing a repetitive common operator input for a plurality of discrete operating features.

3. The invention of claim 2 further including timing means for automatically advancing the identification of a subsequent operating feature on the display member after a predetermined time period in which an operator has not generated any second input command signals relative to a discrete operating feature.

4. The invention of claim 1 further including timing means for automatically advancing the identification of a subsequent operating feature on the display member after a predetermined time period in which an operator has not generated any second input command signals relative to a discrete operating feature.

5. The invention of claim 2 further including timing means for automatically advancing the identification of a subsequent operating feature on the display member after a predetermined time period.

6. The invention of claim 4 further including means for removing the specific second input command signals from the means for storing and reactivating the predetermined set of first command signals for each discrete operating feature.

7. The invention of claim 6 wherein the means for sequentially displaying an identification of discrete operating features includes an electrically variable display apparatus.

8. The invention of claim 6 wherein the means for sequentially displaying an identification of discrete operating features includes a multi-facet rotatable member positioned adjacent the display member and visible therethrough, the respective facets of the rotatable member providing an identification of a particular operating feature.

9. In a reproduction machine for producing paper copies of original documents having the capacity of providing discrete operating features such as producing one or more copies, varying the magnification of a copy, and changing the kind of the copy paper, the improvement including a control system comprising:

an information display member;

means for sequentially displaying an identification of discrete operating features of the reproduction machine on the same display member;

memory means for storing a predetermined set of first command signals for each discrete operating feature;

operator controlled input key members arranged adjacent to the display member, for selectively generating second input command signals relative to specific operating features, at least one of the identification of a discrete operating features including a plurality of sub-identifications which disclose operator selective features specifically positioned adjacent to only certain predetermined input key members less than all the input key members, and means for storing the specific second input command signals generated by each key member in accordance with the selection of the sub-identification features.

10. The invention of claim 9 wherein the plurality of sub-identification features include specific paper sizes adjacent certain of the input keys.

11. The invention of claim 4 wherein the operator controlled input key members are a ten-key arrangement capable of setting the number of copies.

12. An improved operator control system for a reproduction machine comprising:

an information display means;

means for displaying an identification of discrete operating features of the reproduction machine on the same display member;

means for memorizing data to establish a standard mode of operation for each of the discrete operating features;

means for advancing the identification of a subsequent operating feature on the display member;

a set of control key members operatively positioned relative to the display member for generating input command signals, the individual control key members providing a common operator input for a plurality of discrete operating features;

means for coordinating a particular operating feature that is identified on the display member with a specific input command signal from the common control key members;

means for storing the data of a standard mode for each of the discrete operating features and changing the standard data in response to the specific input command signals generated by an operator activation of a key member in accordance with the identification of a discrete operating feature, and means for controlling an operation of the reproduction machine in accordance with the stored contents of the storing means, whereby a specific standard mode of operation can be automatically set without operating any of the common control key members by the activation of the means for advancing.

13. The invention of claim 12 further including timing means for automatically advancing the identification of a subsequent operating feature on the display member after a predetermined time period in which an operator has not generated any input command signals relative to a discrete operating feature.

14. The invention of claim 12 wherein the means for advancing includes an advancing key member for generating an advancing signal and for starting operation of the advancing means.

15. The invention of claim 12, wherein at least one of the modes of an identification of discrete operating feature includes a plurality of sub-identications which display operator selective options relative to that operating feature and which are arranged adjacent to only a predetermined number of control key members.

16. The invention of claim 13 wherein at least one of the modes of an identification of discrete operating feature includes a plurality of sub-identifications which display operator selective options relative to an operating feature arranged adjacent to only a predetermined number of control key members.

* * * * *